United States Patent
Yang et al.

(10) Patent No.: US 8,693,120 B2
(45) Date of Patent: Apr. 8, 2014

(54) SYSTEMS AND METHODS FOR SAMPLE AVERAGING IN DATA PROCESSING

(75) Inventors: Shaohua Yang, San Jose, CA (US); Changyou Xu, Fremont, CA (US); Wu Chang, Santa Clara, CA (US); Ming Jin, Fremont, CA (US)

(73) Assignee: LSI Corporation, San Jose, CA (US)

( * ) Notice: Subject to any disclaimer, the term of this patent is extended or adjusted under 35 U.S.C. 154(b) by 306 days.

(21) Appl. No.: 13/050,765

(22) Filed: Mar. 17, 2011

(65) Prior Publication Data

US 2012/0236429 A1    Sep. 20, 2012

(51) Int. Cl.
*G11B 5/09*    (2006.01)

(52) U.S. Cl.
USPC .................................. 360/39; 360/31; 360/48

(58) Field of Classification Search
None
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Dismery Mercedes
(74) *Attorney, Agent, or Firm* — Hamilton DeSanctis & Cha (57) ABSTRACT

Various embodiments of the present invention provide systems and methods for data processing. As an example, a data processing circuit is disclosed that includes a read circuit and a combining circuit. The read circuit is operable to provide a first instance of a user data set, a second instance of the user data set, and a third instance of the user data set. The combining circuit is operable to: combine at least a first segment of the first instance of the user data set with a first segment of the second instance of the user data set to yield a first combined data segment; provide a second combined data set that includes a combination of one or more second segments from the second instance of the user data set and the third instance of the user data set; and provide an aggregate data set including at least the first combined data set and the second combined data set. The second combined data set does not incorporate a second segment of the first instance of the user data set.

20 Claims, 5 Drawing Sheets

(56) References Cited

U.S. PATENT DOCUMENTS

| | | |
|---|---|---|
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,157,510 A * | 12/2000 | Schreck et al. ............ 360/77.06 |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,349,011 B1 * | 2/2002 | Choi ........................ 360/77.13 |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,618,215 B2 * | 9/2003 | Fung et al. ...................... 360/31 |
| 6,625,775 B1 | 9/2003 | Kim |
| 6,657,803 B1 | 12/2003 | Ling et al. |
| 6,671,404 B1 | 12/2003 | Katawani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,136,244 B1 | 11/2006 | Rothbert |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,499,238 B2 * | 3/2009 | Annampedu ................... 360/75 |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghavan et al. |
| 7,590,927 B1 | 9/2009 | Shih et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong |
| 7,801,200 B2 | 9/2010 | Tan |
| 7,802,163 B2 | 9/2010 | Tan |
| 8,250,434 B2 * | 8/2012 | Yang et al. .................... 714/758 |
| 8,261,171 B2 * | 9/2012 | Annampedu ................. 714/795 |
| 8,310,775 B1 * | 11/2012 | Boguslawski et al. .......... 360/31 |
| 2003/0063405 A1 | 4/2003 | Jin et al. |
| 2003/0081693 A1 | 5/2003 | Raghaven et al. |
| 2003/0087634 A1 | 5/2003 | Raghaven et al. |
| 2003/0112896 A1 | 6/2003 | Raghaven et al. |
| 2003/0134607 A1 | 7/2003 | Raghaven et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047121 A1 | 3/2007 | Elefeheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam |
| 2008/0301521 A1 | 12/2008 | Gunnam |
| 2009/0185643 A1 | 7/2009 | Fitzpatrick |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 * | 11/2009 | Yang et al. ....................... 341/81 |
| 2009/0274247 A1 * | 11/2009 | Galbraith et al. ............. 375/341 |
| 2010/0002795 A1 | 1/2010 | Raghavan et al. |
| 2010/0042877 A1 | 2/2010 | Tan |
| 2010/0042890 A1 | 2/2010 | Gunam |
| 2010/0050043 A1 | 2/2010 | Savin |
| 2010/0061492 A1 | 3/2010 | Noeldner |
| 2010/0070837 A1 * | 3/2010 | Xu et al. ........................ 714/799 |
| 2010/0101578 A1 | 4/2010 | Zongwang et al. |
| 2010/0164764 A1 | 7/2010 | Nayak |
| 2010/0185914 A1 | 7/2010 | Tan et al. |
| 2011/0075569 A1 | 3/2011 | Marrow et al. |
| 2011/0080211 A1 | 4/2011 | Yang et al. |
| 2011/0167246 A1 | 7/2011 | Yang et al. |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.

(56) References Cited

OTHER PUBLICATIONS

U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System Architectures: Synergies with Solid-State Disks" Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)" (dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center Ny, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 2/04.
Weon-Cheol Lee et al., "Vitierbi Decoding Method Using Channel State Info. in COFDM System" IEEE Trans. on Consumer Elect., IEEE Service Center, NY, NY vol. 45, No. 3 08/99.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irreg. of Row-Weight Distrib. of the Parity-Chk. Matirx in Irreg. LDPC Codes for 10-Gb/s Opt. Signals" Jrnl of Lightwave Tech., vol. 23, 09/05.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VLSI Implementation", IEEE Transactions on Magnetics, v. 43, pp. 1118-1123, March 7.
Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR SAMPLE AVERAGING IN DATA PROCESSING

BACKGROUND OF THE INVENTION

The present inventions are related to systems and methods for data processing, and more particularly to systems and methods for noise reduction in a data processing system.

Various circuits have been developed that provide for retrieving data from a storage medium. A typical data retrieval system includes a sensor for sensing magnetic information from the storage medium, and a read channel circuit operable to decode the retrieved information. In some cases, noise is evident in the retrieved information that prevents the read channel circuit from recovering the originally written data. In such cases, the read process may fail.

Hence, for at least the aforementioned reasons, there exists a need in the art for advanced systems and methods for recovering data from a storage medium.

BRIEF SUMMARY OF THE INVENTION

The present inventions are related to systems and methods for data processing, and more particularly to systems and methods for noise reduction in a data processing system.

Various embodiments of the present inventions provide data processing circuits that include a read circuit and a combining circuit. The read circuit is operable to provide a first instance of a user data set, a second instance of the user data set, and a third instance of the user data set. The combining circuit is operable to: combine at least a first segment of the first instance of the user data set with a first segment of the second instance of the user data set to yield a first combined data segment; provide a second combined data set that includes a combination of one or more second segments from the second instance of the user data set and the third instance of the user data set; and provide an aggregate data set including at least the first combined data set and the second combined data set. The second combined data set does not incorporate a second segment of the first instance of the user data set.

In some instances of the aforementioned embodiments, the data processing circuit further includes a data detector circuit operable to apply a data detection algorithm to the aggregate data set to yield a detected data set. Such a data detector circuit may be, but is not limited to, a maximum a posteriori data detector circuit and a Viterbi algorithm detector circuit. In some cases, the data processing circuit further includes a data decoder circuit operable to apply a data decoding algorithm to the detected data set to yield a decoded data set. The data decoder circuit may be, but is not limited to, low density parity check decoder circuit.

In one or more instances of the aforementioned embodiments, the first combined data set is an average of at least the first segment of the first instance of the user data set and the first segment of the second instance of the user data. In various instances of the aforementioned embodiments, the first combined data set is a weighted average of at least the first segment of the first instance of the user data set and the first segment of the second instance of the user data. In some instances of the aforementioned embodiments, the first combined data set is a pseudo average of at least the first segment of the first instance of the user data set and the first segment of the second instance of the user data.

In some instances of the aforementioned embodiments, the combining circuit includes: a first segment counter operable to provide a first count value indicative of a number of first segments identified; a second segment counter operable to provide a second count value indicative of a number of second segments identified; a coefficient table including at least two pairs of new data averaging coefficients and accumulated data averaging coefficients each corresponding to a respective one of the first count value and the second count value; a first multiplier circuit operable to multiply a recently received instance of the first segment of the user data set by the new data averaging coefficient corresponding to the first count value to yield a new product; a second multiplier circuit operable to multiply the first combined data segment by the accumulated data averaging coefficient to yield an accumulated product; and a summation circuit operable to sum the first new product with the first accumulated data product to yield a sum, and to update the first combined data segment to include the sum.

Other embodiments of the present invention provide methods for processing data sets that include: performing a first read of a user data set to yield a first instance of the user data set; performing a second read of a user data set to yield a second instance of the user data set; combining at least a first segment of the first instance of the user data set with a first segment of the second instance of the user data set to yield a first combined data segment; providing a second combined data set that is a combination of at least a second segment of the first instance of the user data set, and wherein the combination excludes a second segment of the second instance of the user data set; and providing at least the first combined data set and the second combined data set as an aggregate data set.

Yet other embodiments of the present invention provide data storage devices that include: a storage medium, a sensor device, an analog to digital converter circuit, an equalizer circuit, and a combining circuit. The storage medium maintains information that is sensed by the sensor device and provided as a corresponding analog signal. The analog to digital converter circuit is operable to convert a derivative of the analog signal to a series of digital samples, and the equalizer circuit is operable to perform an equalization on the series of digital samples to yield a first equalized output corresponding to a first read of the information, a second equalized output corresponding to a second read of the information, and a third equalized output corresponding to a third read of the information. The combining circuit is operable to: combine at least a first segment of the first equalized output with a first segment of the equalized output to yield a first combined data segment; provide a second combined data set that includes a combination of one or more second segments from the second equalized output and the third equalized output, and wherein the second combined data set excludes a second segment of the first equalized output; and provide an aggregate data set including at least the first combined data set and the second combined data set.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for noise reduction in a data processing system.

Figure 1:
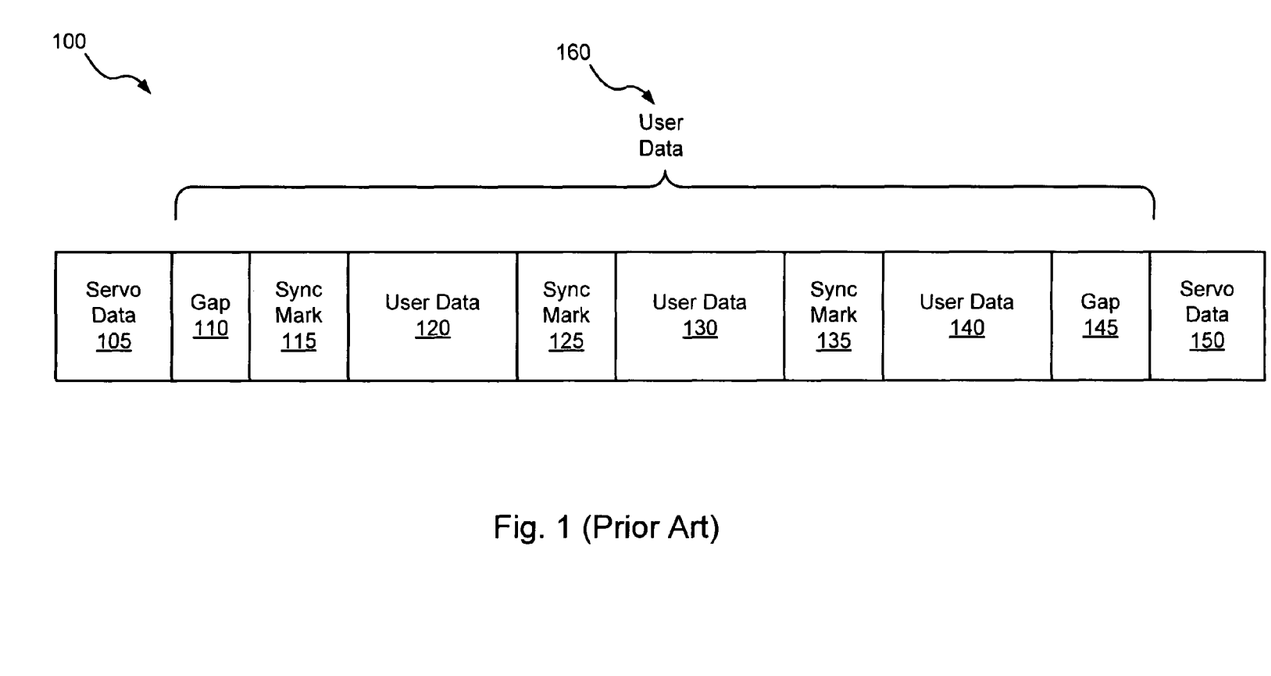
FIG. 1 depicts a prior art organization of data on a storage medium.

Turning to FIG. 1, a prior art organization 100 of data on a storage medium is depicted. Organization 100 includes servo data regions 105, 150 that each includes various information used to determine where on the storage medium the associated data is located. A user data region 160 exists between instances of servo data regions 105, 150. User data region 160 includes a gap 110 between servo data 105 and a sync mark 115 associated with a first segment of user data 120. Sync mark 115 is one or more bit periods of information that can be used to indicate the beginning and position of user data 120. User data region 160 includes a number of pairs of sync marks 115 and user data 120 each comprising a segment. As used herein, one of ordinary skill in the art will recognize a number of different approaches and formats that may be used in populating user data region, along with a variety of numbers of sync marks and user data pairs that may be used. In this case, user data region includes three sync mark and user data portions (i.e., sync mark 115, user data 120, sync mark 125, user data 130, sync mark 135, and user data 140). The last user data (i.e., user data 140) in user data region 160 is separated from the next servo data (i.e., servo data region 150) by a gap 145. Gaps 110, 145 allow for timing differences between servo data regions 105, 150 and user data region 160.

It should be noted that while various embodiments of the present invention operate on data structures similar to that described in relation to FIG. 1, that other embodiments of the present invention may work on single sectors of data disposed between two servo data regions. This may be the case, for example, in a retry or offline mode using Y-averaging where a single sector of data is segmented by n intervening servo data region (i.e., the sector of data extends to both sides of, for example, servo data 150). The portions on either side of the servo data region are referred to as fragments. Based upon the disclosure provided herein, one of ordinary skill in the art will recognize a variety of other data structures on which embodiments of the present invention may operate.

Various embodiments of the present invention provide systems, circuits, methods and devices for processing data. The data processing includes a capability to average multiple data sets on a bit period by bit period basis, and to perform data processing on the resulting averaged data set. Such averaging enhances the possibility of recovering an originally received data set that may have been corrupted by noise which is mitigated through the averaging process. In some cases, the averaging process is applied on a segment by segment basis. This allows for inclusion of a data segment in an averaged data set even if other segments within a given user data region are not properly detected. By allowing segments to be averaged independently, the scenario where a large number of re-reads are required to establish a meaningful average due to repeated failures to properly process one or more segments in the data set is avoided. As used herein, the phrase "data segment" is defined broadly to mean any portion of a user data region that includes less than all of the user data in the user data region. Thus, as one example, the combination of sync mark 115 and user data 120 may be considered a data segment. As another example, user data 120 or some portion thereof may be considered a data segment. Based upon the disclosure provided herein, one of ordinary skill in the art will recognize other data segments that may be used in relation to different embodiments of the present invention. The phrase "user data region" is used in its broadest sense to mean any area where data is stored and from which data can be read and recovered. Thus, as one example, the data between servo data region 105 and servo data region 150 may be considered a user data region.

Figure 2:
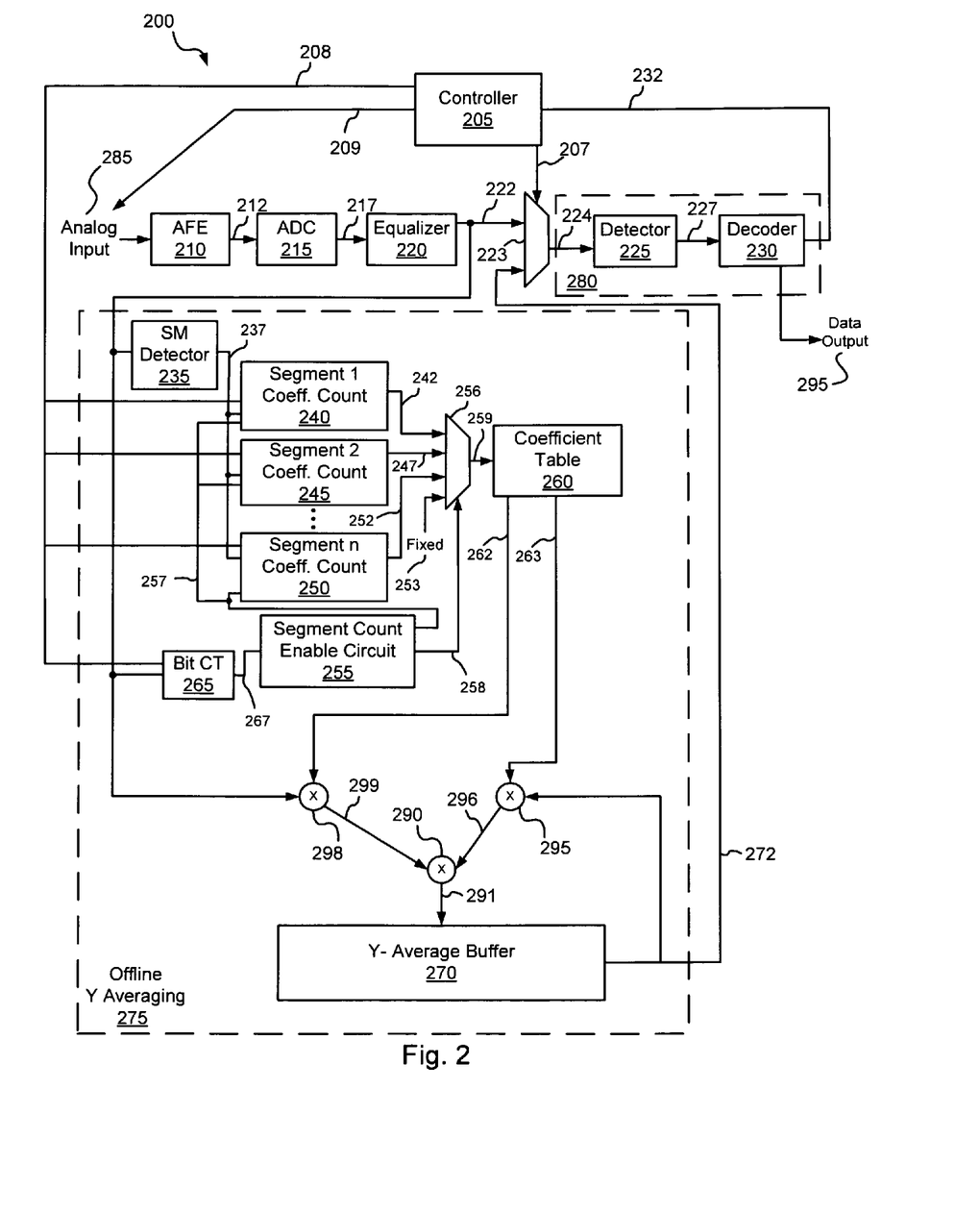
FIG. 2 depicts a data processing circuit operable to perform segment based Y averaging in accordance with some embodiments of the present invention.

Turning to FIG. 2, a data processing circuit 200 operable to perform segment based Y averaging is shown in accordance with some embodiments of the present invention. Data processing circuit 200 includes an analog front end circuit 210 that receives an analog input 285 and provides a processed analog signal 212. Analog front end circuit 210 may be any analog processing circuit known in the art. In one particular embodiment of the present invention, analog front end circuit 210 includes an amplifier circuit and a continuous time filter (i.e., an analog filter) that operate to amplify and noise filter the received input to yield processed analog signal 212. An analog to digital converter circuit 215 converts processed analog signal 212 into a series of digital samples 217. Analog to digital converter circuit 215 may be any circuit known in the art that is capable of providing a series of digital samples that correspond to a received analog input. Digital samples 217 are provided to an equalizer circuit 220 that yields a corresponding equalized output 222. In some embodiments of the present invention, equalizer circuit 220 is implemented one or more digital finite impulse response filters as are known in the art. Based on the disclosure provided herein, one of ordinary skill in the art will recognize a variety of equalizer circuits that may be used in relation to different embodiments of the present invention.

Equalized output 222 is provided to a data processor circuit 280 as a selected output 224 via a selector circuit 223. Data processor circuit 280 includes a data detector circuit 225 and a data decoder circuit 230. Data detector circuit 225 applies a data detection algorithm to selected output 224 to yield a detected output 227. Data detector circuit 225 may be any data detector circuit known in the art including, but not limited to, a Viterbi algorithm data detector circuit or a maximum a posteriori data detector circuit. Data decoder circuit 230 applies a data decoding algorithm to detected output 227 to yield a data output 295, and a status indicator 232. Status indicator 232 indicates whether the received data set converged (i.e., was correctly decoded), or whether errors remained. Data decoder circuit 230 may be any data decoder circuit known in the art. In one embodiment of the present invention, data decoder circuit 230 is a low density parity check decoder circuit. Status indicator 232 is provided to a controller circuit 205.

Controller circuit 205 provides a number of controls to other circuits. In particular, controller circuit 205 provides a selector control 207 to selector circuit 223. Depending upon the assertion level of selector control 207, selector circuit 223 provides either equalizer output 222 or an averaged output 272 as selected output 224. In addition, controller circuit 205 provides a read control 209 that controls what data is provided as analog input 285. In some cases, analog input 285 is derived from a storage medium (not shown) using a read/write head assembly (not shown). In such cases, read control 209 allows for a new area of the storage medium to be read, or a re-read thereof. In a retry situation, data may be re-read multiple times with each of the multiple times being combined to yield averaged output 272. Such a retry situation may be triggered by, for example, an indication from status indicator 232 that the decoding process failed. When such a retry condition is triggered, selector control 207 causes selector circuit 223 to select averaged output 272 as selected output 224, and read control 209 causes the storage medium to be re-read resulting in analog input 285 being repeated. Controller circuit 205 also provides a reset control 208. Reset control 208 is asserted at the beginning of a retry condition to indicate the start of the averaging process that ultimately yields averaged output 272.

Data processing circuit 200 includes an offline Y averaging circuit 275 that receives reset control 208 and equalized output 222, and provides averaged output 272. Offline Y averaging circuit 275 includes a bit counter 265 that is operable to count each bit of equalizer output 222 (i.e., each bit period of a user data region 160) and provides a bit count output 267 that is provided to a segment count enable circuit 255. Segment count enable circuit 255 provides count enables 257 to segment coefficient counters 240, 245, 250. Count enables 257 are asserted to each of the respective segment coefficient counters 240, 245, 250 for a window based on bit count output 267 surrounding the time when a sync mark 237 corresponding to the particular segment is expected.

In addition, offline Y averaging circuit 275 includes a sync mark (SM) detector circuit 235 that is operable to identify sync marks within user data regions. Sync mark detector 235 may be any circuit known in the art for identifying a sync pattern in a data stream. Sync mark detector circuit 235 provides sync mark output 237 that is asserted whenever a sync mark is identified. Sync mark output 237 is provided to segment coefficient counters 240, 245, 250. When the enable of count enables 257 corresponding to the particular segment coefficient counter 240, 245, 250 is asserted, that particular segment coefficient counter is incremented upon assertion of sync mark output 237.

In this way, segment coefficient counters 240, 245, 250 count respective pairs of sync marks and user data portions within a user data region (e.g., the pair of sync mark 115 and user data 120). The number of segment coefficient counters corresponds to the expected number of pairs of sync marks and user data within the user data region. In particular, segment coefficient counter 240 counts the first segment within the user data region (i.e., a segment corresponding to a certain value of bit count output 267), and provides the resulting count value as a count output 242; segment coefficient counter 245 counts the second segment within the user data region (i.e., a segment corresponding to a certain value of bit count output 267), and provides the resulting count value as a count output 247; and segment coefficient counter 250 counts the nth segment within the user data region (i.e., a segment corresponding to a certain value of bit count output 267), and provides the resulting count value as a count output 252. In some cases, an error occurs in detecting a sync mark and thus the data from that segment is not recovered. In such a case, the data from the defective segment is ignored and the corresponding segment coefficient counter is not incremented. In such a circumstance, where analog input 285 is repeated x number of times during a retry process, one or more of count output 242, count output 247, or count output 252 would be less than x. Alternatively, where every segment of data is accurately identified, all of count output 242, count output 247, and count output 252 would have the same count x. Monitoring each user data segment using a separate segment coefficient counter allows for the data averaging to be performed on a segment by segment basis. In this way, an entire re-read of data is not lost for averaging purposes where less than all of the segments cannot be detected for some reason.

Segment count enable circuit 255 provides a selector input 258 to a selector circuit 256 that selects one of count output 242, count output 247, count output 252, or a fixed address 253 to be provided as a table address 259. In particular, selector input 258 is operable to: select count output 242 as table address 259 for a period when the first segment of the user data is being received, select count output 247 as table address 259 for a period when the second segment of the user data is being received, select count output 252 as table address 259 for a period when the nth segment of the user data is being received; and fixed address 253 as table address 259 for a period when the there was a failure to identify the sync mark for a data segment.

Table address 259 is operable to select averaging coefficients from a coefficient table 260. Based on table address 259, coefficient table 260 provides a new data averaging coefficient 262 and an accumulated data averaging coefficient 263. These averaging coefficients are used to weight the newly received data relative to the already accumulated data to yield an average value. For example, where the count value (i.e., the selected one of count output 242, count output 247, or count output 252) is zero (i.e., the first time the segment is received), new data averaging coefficient 262 is one and accumulated data averaging coefficient 263 is zero. In this case, equalized output 222 corresponding to the segment being processed (the newly received data set) is multiplied by one by a multiplier circuit 298 and provided as a weighted output 299 to a summation circuit 290. Averaged data 272 from a Y-averaging buffer 270 is multiplied by zero by a multiplier circuit 295 and provided as a weighted output 296 to summation circuit 290. In turn, summation circuit 290 adds weighted output 299 to weighted output 296 to yield an average output 291 that is stored to Y-averaging buffer 270. Of note, when table address 259 is zero (i.e., equalized output 222 corresponds to the first re-read of the track), and average output 272 is equalized output 222.

As another example, when table address 259 is one, new data averaging coefficient 262 is 0.5 and accumulated data averaging coefficient 263 is 0.5. In this case, equalized output 222 is multiplied by 0.5 by multiplier circuit 298 and provided as weighted output 299 to summation circuit 290; and average output 272 is multiplied by 0.5 by multiplier circuit 295 and provided as weighted output 296 to summation circuit 290. In turn, summation circuit 290 adds weighted output 296 to weighted output 299 to yield an average output 291 that is stored to Y average buffer 270. Of note, in this case (i.e., equalized output 222 corresponds to the second re-read of the track), average output 291 is the average of equalized output 222 and the prior average output 272.

As yet another example, when table address 259 is two, new data averaging coefficient 262 is 0.33 and accumulated data averaging coefficient 263 is 0.67. In this case, equalized output 222 is multiplied by 0.33 by multiplier circuit 298 and provided as weighted output 299 to summation circuit 290; and average output 272 is multiplied by 0.67 by multiplier circuit 295 and provided as weighted output 296 to summation circuit 290. In turn, summation circuit 290 adds weighted output 299 to weighted output 296 to yield an average output 291 that is stored to Y average buffer 270. Of note, in this case (i.e., equalized output 222 corresponds to the third re-read of the track), average output 291 is the weighted average of equalized output 222 and average output 272.

Where, the sync mark for a given track could not be found, segment count enable circuit 255 asserts selector input 258 to select fixed address 253 as table address 259. In this case, new data averaging coefficient 262 is 0.0 and accumulated data averaging coefficient 263 is 1. Equalized output 222 is multiplied by 0.0 by multiplier circuit 298 and provided as weighted output 299 to summation circuit 290; and average output 272 is multiplied by 1.0 by multiplier circuit 295 and provided as weighted output 296 to summation circuit 290. In turn, summation circuit 290 adds weighted output 296 to weighted output 299 to yield an average output 291 that is stored to Y average buffer 270. Of note, in this case (i.e., equalized output 222 corresponds to an inaccessible segment of the user data), average output 291 is equal to average output 272.

As each segment is received, average data 272 is provided to data processor circuit 280 via selector circuit 223. Data processor circuit 280 processes average data 272, and where the processing converges, it is presumed that the data error that triggered the retry condition was corrected by the averaging process. Where such convergence occurs, the next analog input 285 is selected by controller circuit 205 and equalized output 222 is selected as selected output 224 via a selector circuit 223 and normal processing resumes. Otherwise, the data is re-read and averaged with average data 272 in another attempt to converge.

Figure 3:
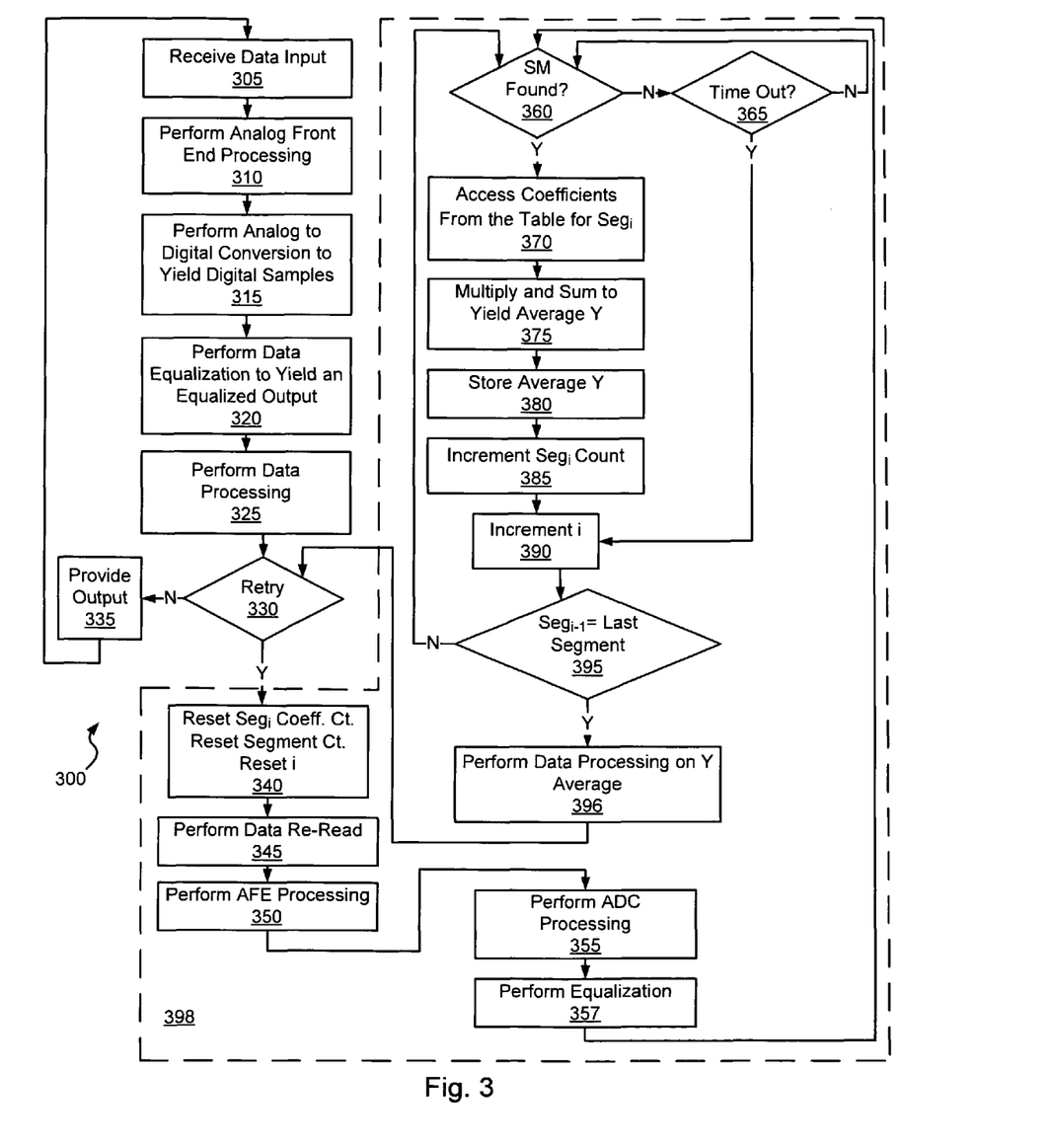
FIG. 3 is a flow diagram showing a method for segment based noise averaging in a data processing circuit in accordance with some embodiments of the present invention.

Turning to FIG. 3, a flow diagram 300 shows a method for noise averaging in a data processing circuit in accordance with some embodiments of the present invention. Following flow diagram 300 a data input is received (block 305). The data input may be received as an analog input that corresponds to information maintained on a storage medium. Analog front end processing is applied to the received data to yield a processed output (block 310). The analog front end processing may be any analog processing known in the art including, but not limited to, amplification and filtering. The processed output is converted to a series of digital samples by an analog to digital conversion process (block 315). The analog to digital conversion process may be any process known in the art for converting an analog signal to corresponding digital samples. A data equalization process is then applied to the digital samples to yield an equalized output (block 320). In some embodiments of the present invention, the equalization process is performed by one or more digital finite impulse filters. Based upon the disclosure provided herein, one of ordinary skill in the art will recognize a variety of equalization methods that may be used in relation to different embodiments of the present invention.

Data processing is performed on the equalized output (block 325). The data processing may include, but is not limited to, performing a combination of a data detection process and a data decoding process as are known in the art. In one embodiment, the data detection process is a Viterbi algorithm detection process or a maximum a posteriori detection process as are known in the art, and the data decoding process is a low density parity check decoding process as is known in the art. Based upon the disclosure provided herein, one of ordinary skill in the art will recognize a variety of data decoding and data detection processes that can be used in relation to different embodiments of the present invention. As an example, the data processing may be performed using a data processing circuit similar to that disclosed in U.S. patent application Ser. No. 12/114,462 entitled "Systems and Methods for Queue Based Data Detection and Decoding" and filed May 2, 2008 by Yang et al. The entirety of the aforementioned application is incorporated herein by reference for all purposes. Based upon the disclosure provided herein, one of ordinary skill in the art will recognize other data processing circuits that may be used.

It is determined whether the data processing (block 325) converged, and if not whether an offline retry is desired (block 330). In some cases, an offline retry is performed any time the originally read data failed to converge. Where a retry is not desired (block 330), whatever output was developed by the data processing is provided (block 335), and the processes of blocks 305-330 are repeated for the next input data set.

Alternatively, where a retry is desired (block 330), preparation for the retry is performed by resetting all of the segment coefficient counters (i.e., $Seg_i$ Coeff. Ct.), the segment counter (i.e., Segment Ct.), and an index i (block 340). In addition, the previously non-converging data set is re-read (block 345). This may be done, for example, by positioning a read/write head assembly over a location on a storage medium where the data is located and sensing the data from the storage medium. Analog front end processing is applied to the re-read data to yield a processed output (block 350). The analog front end processing may be the same as that performed above in relation to block 310. The processed output is then converted to a series of digital samples by an analog to digital conversion process (block 355), and a data equalization process is then applied to the digital samples to yield an equalized output (block 357).

As the equalized data is received (block 357) is queried for a sync mark indicating the beginning of a data segment including user data (block 360). The process of looking for a sync mark continues until either a sync mark is found, or until a time out condition occurs (block 365). A time out occurs when the period of an expected sync mark passes. Where a timeout condition occurs (block 365), the index i is incremented to point at the next segment (block 390). It is determined if the previously considered segment (i.e., $Seg_{i-1}$) is the last segment expected in the user data region (e.g., sync mark 135 and user data 140) (block 395).

Alternatively, where a sync mark is found (block 360), coefficients (e.g., new data averaging coefficient 262 and accumulated data averaging coefficient 263) corresponding to the count for the particular segment being processed (i.e., $Seg_i$ Count) are retrieved from the coefficient table (block 370). These coefficients are then used to update the running average of data by multiplying and summing to yield an average Y value (block 375). This may include, for example, multiplying the newly received data with one of the coefficients to yield a first product and the previous Y averaged data by another of the coefficients to yield a second product. The first product is then summed with the second product to yield an updated average Y value. Such averaging may be expressed by the following equation:

$$Y\text{ Average} = (\text{Received Data})(\text{New Data Averaging Coefficient}) + (Y\text{ Average})(\text{Accumulated Data Averaging Coefficient})$$

It should be noted that any approach known in the art for averaging a received data set with an existing average of the data set may be used. Such averaging may be true averaging where each of the received data sets are equally weighted, or a modified average where each received data set is not weighted identically in the final average value. The average Y value is then stored to memory (block 380). The segment counter ($Seg_i$ Count) corresponding to the previously processed segment is then incremented in preparation for a next re-read of the data if it occurs (block 385). The index i is incremented to point at the next segment (block 390). It is determined if the previously considered segment (i.e., $Seg_{i-1}$) is the last segment expected in the user data region (e.g., sync mark 135 and user data 140) (block 395).

Where it is determined that all of the segments of the user data region have not yet been processed (i.e., $Seg_{i-1}$ is not the last segment)(block 395), the processes of blocks 360 through 395 are repeated for the remaining segments in the user data region. Alternatively, where the last segment of the user data region has been processed, data processing is performed on the averaged data set (i.e., the collection of average Y values previously stored to memory) (block 396). This processing may be any processing known in the art. In one particular embodiment of the present invention, the processing includes one or more iterations of a data detection process followed by a data decoding process. In some cases, the data processing is the same as that performed in block 325. With the data processing completed, it is again determined whether the result or other factors indicate that the offline retry should be completed or if the process should end. In one particular embodiment, the process ends when either the data processing converges or a timeout condition is met.

Figure 4:
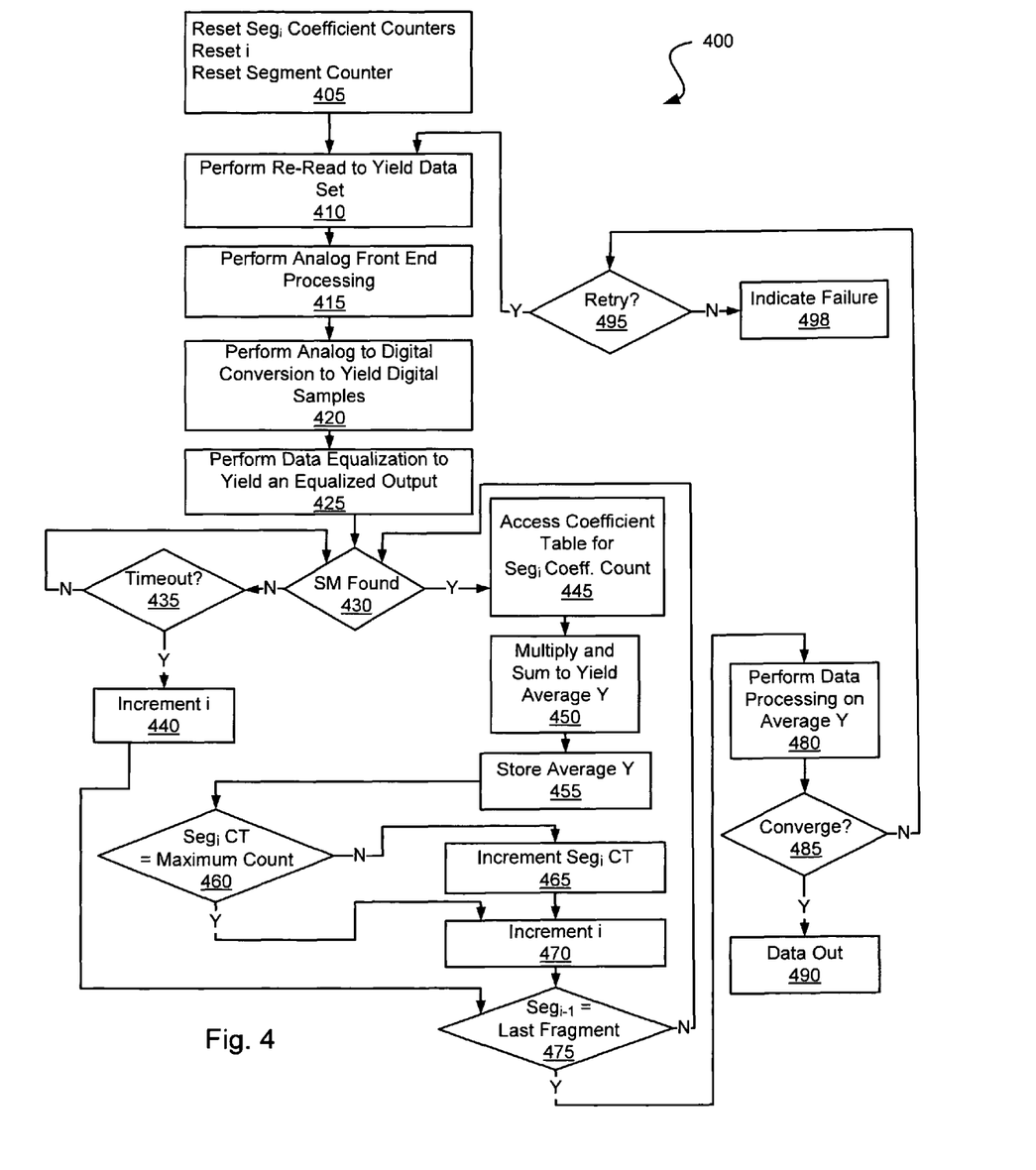
FIG. 4 is a flow diagram showing a retry approach involving data processing of pseudo averaged data in accordance with other embodiments of the present invention.

Turning to FIG. 4 a flow diagram 400 shows a retry approach involving data processing of noise averaged data in accordance with other embodiments of the present invention. This approach describes a method operating during a retry condition where data is re-read multiple time to create a Y averaged data to process. Following flow diagram 400, at the outset the retry process is initialized by resetting all of the segment coefficient counters (i.e., $Seg_i$ Coefficient Counters), the segment counter (i.e., Segment Counter), and an index i (block 405). In addition, the previously non-converging data set is re-read from the storage medium (block 410). This may be done, for example, by positioning a read/write head assembly over a location on a storage medium where the data is located and sensing the data from the storage medium. Analog front end processing is applied to the re-read data to yield a processed output (block 415). The analog front end processing may be any analog processing known in the art including, but not limited to, amplification and filtering. The processed output is converted to a series of digital samples by an analog to digital conversion process (block 420). The analog to digital conversion process may be any process known in the art for converting an analog signal to corresponding digital samples. A data equalization process is then applied to the digital samples to yield an equalized output (block 425). In some embodiments of the present invention, the equalization process is performed by one or more digital finite impulse filters. Based upon the disclosure provided herein, one of ordinary skill in the art will recognize a variety of equalization methods that may be used in relation to different embodiments of the present invention.

The equalized output is queried for sync marks corresponding to respective pairs of sync mark and user data within the user data region. It is determined whether a sync mark indicating the beginning of a segment of user data has been found (block 430). The process of looking for a sync mark continues until either a sync mark is found, or until a time out condition occurs (block 435). A time out occurs when the period of an expected sync mark passes. Where a timeout condition occurs (block 435), the index i is incremented to point at the next expected segment (block 440). It is determined if the previously considered segment (i.e., $Seg_{i-1}$) is the last segment expected in the user data region (e.g., sync mark 135 and user data 140) (block 475).

Alternatively, where a sync mark is found (block 430), coefficients (e.g., new data averaging coefficient 262 and accumulated data averaging coefficient 263) corresponding to the count for the particular segment being processed (i.e., $Seg_i$ Coefficient Count) are retrieved from a coefficient table (block 445). These coefficients are then used to update the running average of data by multiplying and summing to yield an average Y value (block 450). This may include, for example, multiplying the newly received data with one of the coefficients to yield a first product and the previous Y averaged data by another of the coefficients to yield a second product. The first product is then summed with the second product to yield an updated average Y value. It should be noted that any approach known in the art for averaging a received data set with an existing average of the data set may be used. In this case, such averaging is a modified average where each received data set is not weighted identically in the final average value. In particular, as explained below, the average is controlled by the coefficients pulled from the coefficient table, and the coefficients do not change after a maximum $Seg_i$ Coefficient Count is achieved. As an example, for the first eight correctly received re-reads the coefficients are changes such that each received re-read is equally weighted in the average. For the ninth and future re-reads of the segment, the same coefficients used for the eighth re-read are used. This results in a slightly higher weighting being given to the ninth and later re-reads than was applied to the first eight re-reads. It should be noted that this modification at the eighth re-read can be changed to occur at an earlier or later re-read. The following table provides an example of the coefficients used for the respective re-reads assuming the coefficients are re-used after the eighth re-read:

| Re-Read Number | new data averaging coefficient 262 | accumulated data averaging coefficient 263 |
| --- | --- | --- |
| 1 | 1.000 | 0.000 |
| 2 | 0.5000 | 0.500 |
| 3 | 0.333 | 0.667 |
| 4 | 0.250 | 0.750 |
| 5 | 0.200 | 0.800 |
| 6 | 0.167 | 0.833 |
| 7 | 0.143 | 0.857 |
| 8 | 0.125 | 0.875 |
| 9 | 0.125 | 0.875 |
| 10 | 0.125 | 0.875 |
| Misread | 0.000 | 1.000 |

Multiply and summing to yield the average Y may be done in accordance with the following equation:

$$Y\text{ Average} = (\text{Received Data})(\text{New Data Averaging Coefficient}) + (Y\text{ Average})(\text{Accumulated Data Averaging Coefficient})$$

The average Y value is then stored to memory (block 455). It is then determined whether the segment counter value ($Seg_i$ Count) is equal to a maximum count (block 460). Where the segment counter value has not been incremented to the maximum (block 460), it is incremented in preparation for a next re-read of the data if it occurs (block 465). Otherwise, where the segment counter value has already been incremented to the maximum (block 460), the incrementing step is skipped as the coefficients corresponding to the maximum count will be re-used for all subsequent averaging as previously described. The index i is incremented to point at the next segment (block 470). It is determined if the previously considered segment (i.e., $Seg_{i-1}$) is the last segment expected in the user data region (e.g., sync mark 135 and user data 140) (block 475).

Where it is determined that all of the segments of the user data region have not yet been processed (i.e., $Seg_{i-1}$ is not the last segment)(block 475), the processes of blocks 430 through 475 are repeated for the remaining segments in the user data region. Alternatively, where the last segment of the user data region has been processed (block 475), data processing is performed on the averaged data set (i.e., the collection of average Y values previously stored to memory) (block 480). This processing may be any processing known in the art. The data processing may include, but is not limited to, performing a combination of a data detection process and a data decoding process as are known in the art. In one embodiment, the data detection process is a Viterbi algorithm detection process or a maximum a posteriori detection process as are known in the art, and the data decoding process is a low density parity check decoding process as is known in the art. Based upon the disclosure provided herein, one of ordinary skill in the art will recognize a variety of data decoding and data detection processes that can be used in relation to different embodiments of the present invention. As an example, the data processing may be performed using a data processing circuit similar to that disclosed in U.S. patent application Ser. No. 12/114,462 entitled "Systems and Methods for Queue Based Data Detection and Decoding" and filed May 2, 2008 by Yang et al. The entirety of the aforementioned application is incorporated herein by reference for all purposes. Based upon the disclosure provided herein, one of ordinary skill in the art will recognize other data processing circuits that may be used.

It is determined whether the data processing converged (block 485). Such convergence is generally defined as a situation where the data processing resulted in recovery of the data originally written to the storage medium. Based upon the disclosure provided herein, one of ordinary skill in the art will recognize a variety of basis upon which a determination of convergence may rest. Where the data did converge (block 485), the process completes and the data set produced by the data processing is provided as a data output (block 490).

Alternatively, where the data did not converge (block 485) it is determined if another retry is desired (block 495). Another retry may be desired, for example, where a timeout condition limiting the number of retries has not yet been exceeded. Based upon the disclosure provided herein, one of ordinary skill in the art will recognize a variety of basis upon which another retry may rest. Where another retry is desired (block 495), the processes of blocks 410-495 are performed again for the same data resulting in the data processing of an updated Y average. Alternatively, where another retry is not desired (block 495), a process failure is generated (block 498).

Figure 5:
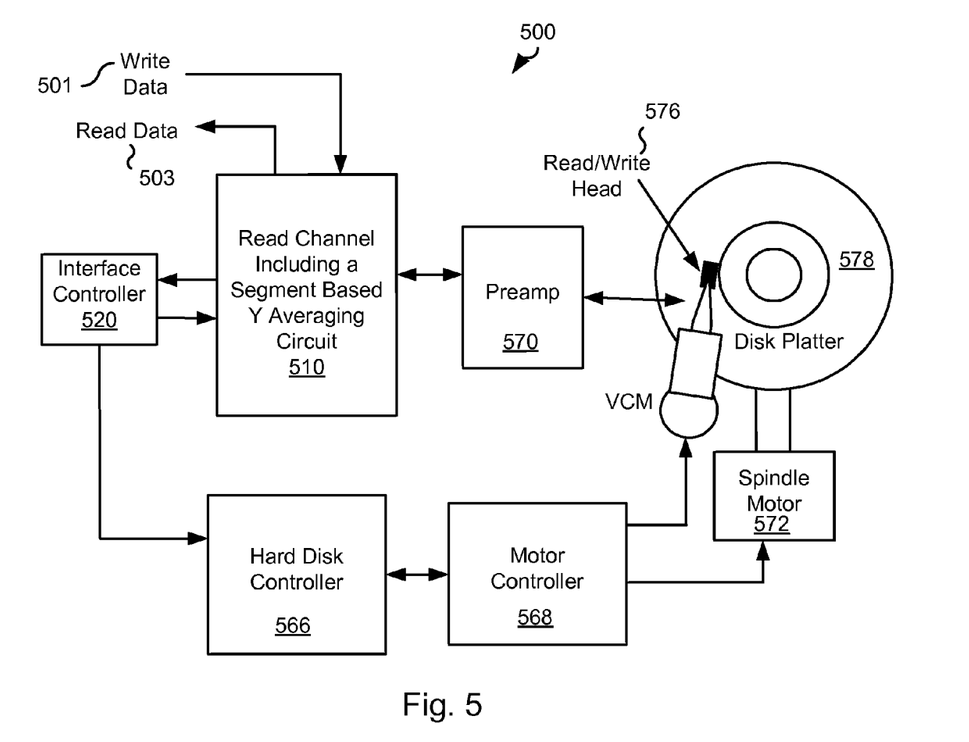
FIG. 5 shows a storage system including a read channel with a segment based Y averaging circuit in accordance with one or more embodiments of the present invention.

Turning to FIG. 5, a storage system 500 including a read channel circuit 510 with a segment based Y averaging circuit is shown in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel circuit 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. A write operation is substantially the opposite of the preceding read operation with write data 501 being provided to read channel circuit 510. This data is then encoded and written to disk platter 578.

Read channel circuit 510 includes the segment based Y averaging circuit operable to recover data that is not initially recovered. Where an initial attempt to recover data fails, the segment based Y averaging circuit operates to smooth any noise using multiple reads similar to that disclosed above in relation to FIGS. 2-4. In some cases, the segment based Y averaging circuit is implemented similar to that discussed in relation to FIG. 2, and/or may operate consistent with the method discussed in relation to FIG. 3 and FIG. 4 below.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the inven-

What is claimed is:

1. A data processing circuit, the circuit comprising:
a read circuit operable to provide a first instance of a user data set, a second instance of the user data set, and a third instance of the user data set; and
a combining circuit operable to:
combine at least a first segment of the first instance of the user data set with a first segment of the second instance of the user data set to yield a first combined data segment;
provide a second combined data set that includes a combination of one or more second segments from the second instance of the user data set and the third instance of the user data set, and wherein the second combined data set excludes a second segment of the first instance of the user data set; and
provide an aggregate data set including at least the first combined data set and the second combined data set.

2. The data processing circuit of claim 1, wherein the data processing circuit further comprises:
a data detector circuit operable to apply a data detection algorithm to the aggregate data set to yield a detected data set.

3. The data processing circuit of claim 2, wherein the data detector circuit is selected from a group consisting of: a maximum a posteriori data detector circuit, and a Viterbi algorithm detector circuit.

4. The data processing circuit of claim 2, wherein the data processing circuit further comprises:
a data decoder circuit operable to apply a data decoding algorithm to the detected data set to yield a decoded data set.

5. The data processing circuit of claim 4, wherein the data decoder circuit is a low density parity check decoder circuit.

6. The data processing circuit of claim 1, wherein the first combined data set is an average of at least the first segment of the first instance of the user data set and the first segment of the second instance of the user data.

7. The data processing circuit of claim 1, wherein the first combined data set is a weighted average of at least the first segment of the first instance of the user data set and the first segment of the second instance of the user data.

8. The data processing circuit of claim 1, wherein the first combined data set is a pseudo average of at least the first segment of the first instance of the user data set and the first segment of the second instance of the user data.

9. The data processing circuit of claim 1, wherein the data processing circuit is implemented in an integrated circuit.

10. The data processing circuit of claim 1, wherein the data processing circuit is implemented in a storage device.

11. The data processing circuit of claim 10, wherein the read circuit includes a read/write head assembly disposed in relation to a storage medium.

12. The data processing circuit of claim 1, wherein the combining circuit comprises:
a first segment counter operable to provide a first count value indicative of a number of first segments identified;
a second segment counter operable to provide a second count value indicative of a number of second segments identified;
a coefficient table including at least two pairs of new data averaging coefficients and accumulated data averaging coefficients each corresponding to a respective one of the first count value and the second count value;
a first multiplier circuit operable to multiply a recently received instance of the first segment of the user data set by the new data averaging coefficient corresponding to the first count value to yield a new product;
a second multiplier circuit operable to multiply the first combined data segment by the accumulated data averaging coefficient to yield an accumulated product; and
a summation circuit operable to sum the first new product with the first accumulated data product to yield a sum, and to update the first combined data segment to include the sum.

13. A method for processing a data set, the method comprising:
performing a first read of a user data set to yield a first instance of the user data set;
performing a second read of a user data set to yield a second instance of the user data set;
combining at least a first segment of the first instance of the user data set with a first segment of the second instance of the user data set to yield a first combined data segment;
providing a second combined data set that is a combination of at least a second segment of the first instance of the user data set, and wherein the combination excludes a second segment of the second instance of the user data set; and
providing at least the first combined data set and the second combined data set as an aggregate data set.

14. The method of claim 13, wherein combining the first segment of the first instance of the user data set with the first segment of the second instance of the user data set includes averaging the first segment of the first instance of the user data set with the first segment of the second instance of the user data set.

15. The method of claim 13, wherein combining the first segment of the first instance of the user data set with the first segment of the second instance of the user data set includes calculating a weighted average that incorporating the first segment of the first instance of the user data set and the first segment of the second instance of the user data set.

16. The method of claim 13, wherein the method further comprises:
selecting a retry operation that causes the user data set to be re-read multiple times.

17. The method of claim 13, wherein providing at least the first combined data set and the second combined data set as the aggregate data set includes storing the first combined data set to a first location in a memory, storing the second combined data set to a second location in the memory, and accessing the memory to retrieve the aggregate data set.

18. The method of claim 13, wherein the method further comprises:
performing a data detection process on the aggregate data set to yield a detected output; and
performing a data decode process on the detected output to yield a decoded output.

19. A data storage device, the storage device comprising:
a storage medium maintaining information;
a sensor device disposed in relation to the storage medium and operable to sense the information and to provide a corresponding analog signal;
an analog to digital converter circuit operable to convert a derivative of the analog signal to a series of digital samples;
an equalizer circuit operable to perform an equalization on the series of digital samples to yield a first equalized output corresponding to a first read of the information, a second equalized output corresponding to a second read of the information, and a third equalized output corresponding to a third read of the information; and a combining circuit operable to:
  combine at least a first segment of the first equalized output with a first segment of the second equalized output to yield a first combined data segment;
  provide a second combined data set that includes a combination of one or more second segments from the second equalized output and the third equalized output, and wherein the second combined data set excludes a second segment of the first equalized output; and
  provide an aggregate data set including at least the first combined data set and the second combined data set.

20. The storage device of claim 19, wherein the combining circuit comprises:
  a first segment counter operable to provide a first count value indicative of a number of first segments identified;
  a second segment counter operable to provide a second count value indicative of a number of second segments identified;
  a coefficient table including at least two pairs of new data averaging coefficients and accumulated data averaging coefficients each corresponding to a respective one of the first count value and the second count value;
  a first multiplier circuit operable to multiply a recently received instance of the first segment of the equalized output by the new data averaging coefficient corresponding to the first count value to yield a new product;
  a second multiplier circuit operable to multiply the first combined data segment by the accumulated data averaging coefficient to yield an accumulated product; and
  a summation circuit operable to sum the first new product with the first accumulated data product to yield a sum, and to update the first combined data segment to include the sum.

* * * * *